M. D. BEACH.
WHEEL INDICATOR.
APPLICATION FILED MAY 2, 1919.
1,328,978.
Patented Jan. 27, 1920.
2 SHEETS—SHEET 1.
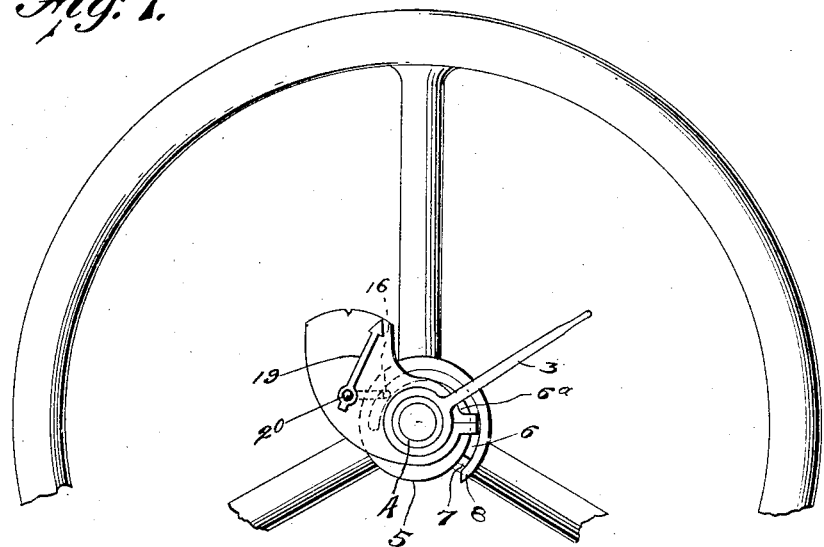
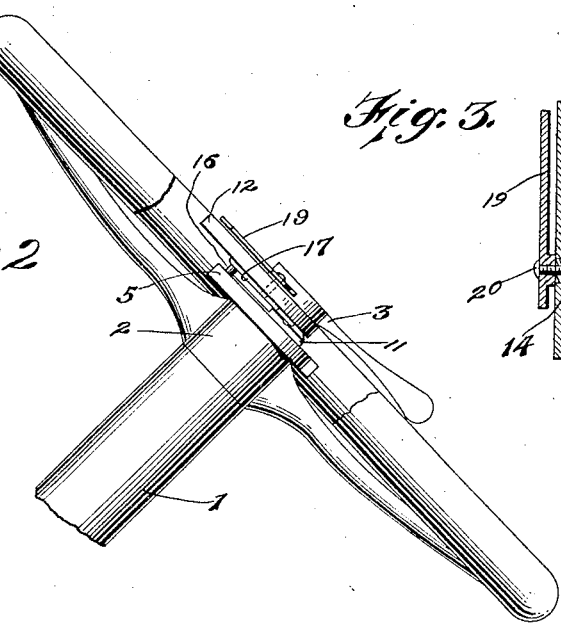
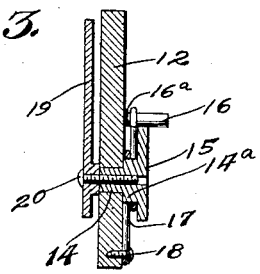
Witness
Inventor
Milo D. Beach
his Attorney

M. D. BEACH.
WHEEL INDICATOR.
APPLICATION FILED MAY 2, 1919.

1,328,978.

Patented Jan. 27, 1920.
2 SHEETS—SHEET 2.

Witness
Jmac Carter

Inventor
Milo D. Beach
By
his Attorney

UNITED STATES PATENT OFFICE.

MILO D. BEACH, OF LITCHFIELD, CONNECTICUT.

WHEEL-INDICATOR.

1,328,978.  Specification of Letters Patent.  Patented Jan. 27, 1920.

Application filed May 2, 1919. Serial No. 294,318.

*To all whom it may concern:*

Be it known that MILO D. BEACH, a citizen of the United States, residing at Litchfield, in the county of Litchfield and State of Connecticut, have invented certain new and useful Improvements in Wheel-Indicators, of which the following is a specification.

This invention relates to wheel indicators for self-propelled vehicles, such as automobiles and trucks, and has for its objects, first, the provision of an indicator operable by the steering post and located conveniently for inspection by the person operating the car, which will disclose the position of the front wheels; second, a front wheel indicator of novel construction; third, a front wheel indicator of novel construction which is operable by the steering post.

My invention differs from earlier indicators which disclose the position of the front wheels of a vehicle, first, in that it is operated either from the steering post or the steering wheel itself; second, in the novel features and combination of parts entering into the indicator itself.

My invention obviates the necessity of providing operative connections between the steering wheels and the indicator, as has heretofore been proposed, and it comprises compact and simple means which may be readily applied to the steering post without necessitating alterations or additions to the automobile or truck.

Certain forms of the invention are described hereinafter and disclosed in the drawings to illustrate the principle of the invention, but such disclosure is to be considered as illustrative, rather than restrictive, of the scope of the invention.

In the accompanying drawings,

Figure 1, is a plan view showing the indicator applied to a steering wheel and its post, stem or shaft;

Fig. 2, is a side elevation thereof;

Fig. 3, is a detail section through the indicator;

Figure 4:
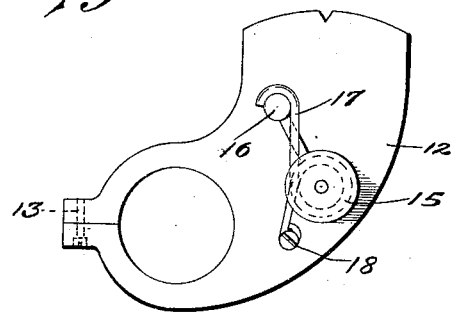
Fig. 4, is a detail bottom view of the indicator.
Figure 5:
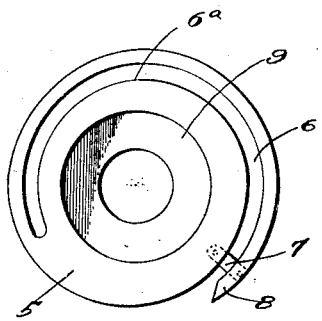
Fig. 5, is a detail bottom view of the cam disk.
Figure 6:
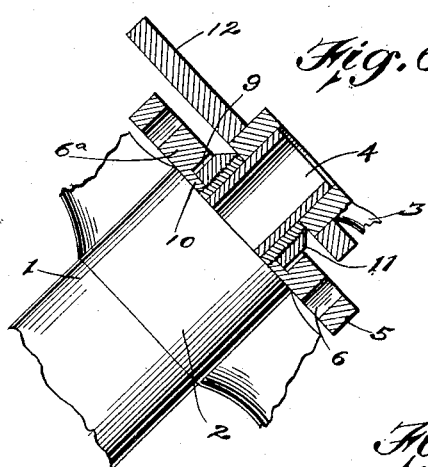
Fig. 6, is an enlarged view, partly in section, showing the indicator applied to a steering wheel and its post, stem or shaft.

As there is a direct operative connection between the steering wheel post or stem and the steering wheels of an automobile or truck, and as my invention depends entirely upon the extent of turning of the steering wheel and its shaft or the steering post, the disclosure in the drawings relates only to the indicator and its manner of attachment and relation to the steering wheel and its shaft or the steering post.

The steering shaft post or stem is shown at 1 and the steering wheel appears at 2, the latter being fixed to the shaft 1, as usual. The throttle sector is shown at 3 and is connected to the tubular stem 4.

In carrying out my invention I provide a disk 5 which is provided with a cam slot 6 braced by a link 7 to prevent the free portion or tongue 8 formed by the slot 6, from vibrating or spreading. The disk 5 is provided with a concavity 9 to make it quite thin at 10 and thereby minimize the extent to which the nut 11 is raised, said nut being the ordinary nut which holds the hub of the wheel 2 on the shaft 1. The concavity 9 receives the nut 11. When the nut 11 is screwed down tight, it clamps the disk 5 firmly against the hub of the wheel 2 and performs the double function of securing the wheel 2 and the disk 5 in position so that they, with the nut, constitute a unitary structure with the hollow steering shaft post or stem 1.

It is obvious, therefore, that the operative part of my invention, the disk 5 having the cam 6, may be said to be combined either with the steering wheel 2 or with the steering shaft 1, or steering post or with both of them. I am aware that the operative device is susceptible of modification in respect to the way the cam 6$^a$ is formed and the manner in which the disk is made to coördinate with the wheel 2 or the shaft 1; and in the claims, when reciting the operation of the disk 5, or, of the entire indicator, by the steering shaft, the hand-wheel-steering shaft or words of like import, it is to be understood that I intend to cover the combination of the indicator or of the disk 5 with the steering wheel or the shaft, or steering post, or both of them as circumstances may require. Similarly, in the claims, when using the words "hand-wheel-steering-shaft" to define the means which actuates the indicator, I intend to cover any form of turnable post, stem, column, shaft, or the like, which is operated by the steering wheel, whether said hand steering wheel is directly fastened to said turnable post, stem, column, shaft, or the like, or is separate therefrom but constituting, nevertheless, the means for turning said post, stem, column or shaft. According to the make of truck or car, circumstances will determine the manner in which the operative part of the indicator is combined with the steering shaft or the steering wheel.

A plate or dial, or the like, 12 is secured to the throttle sector 2 as, for instance, by being clamped therearound by a screw 13. Journaled at 14 in the plate or dial 12 is the hub of a rocker 15 which has a pin, bowl, or follower 16 which is secured in the cam slot 6 and is made to bear upon the inner cam surface 6$^a$ by a spring 17 which is coiled about the larger portion 14$^a$ of the hub and has one end engaged with a pin 18 on the dial 12 and the other end engaged with a continuation 16$^a$ of the pin 16.

Suitably secured to the rocker 15 is an indicator or pointer 19 which lies above the dial or plate 12 and is secured by a screw 20 to the hub 14.

The spring 17 turns the rocker 15 so that the pin or bowl 16 is pressed against the cam surface 6$^a$. Any suitable indicia may be provided on the dial or plate 12. When the pointer 19 is in central position, the front wheels of the automobile or truck are pointing straight ahead. According to the angle to which the front wheels are turned, the pointer will be correspondingly turned due to the corresponding turning of the disk 5 by the turning of the hand wheel 2 and steering shaft or post 1. Consequently, the indicator shows the precise position of the steering wheels which is of great advantage when the car is in snow or mud, and when it is parked or stationary, as the motorist will then know how his steering wheel should be turned, as when starting ahead or backing out of position.

Figure 7:
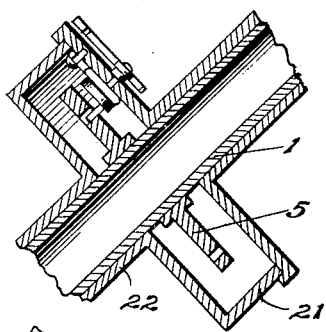
Fig. 7, is a detail section of a modification, applied to the steering post and column.
Figure 8:
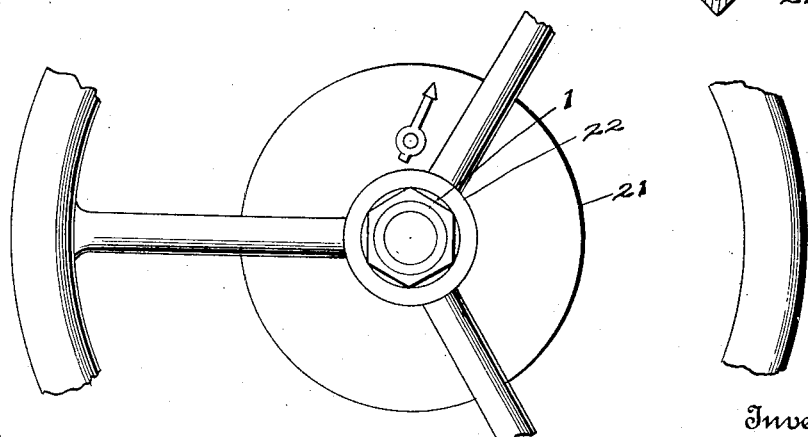
Fig. 8, is a plan view thereof, showing a portion of the steering wheel.

Referring to Figs. 7, 8, I have shown one modification where it might not be possible to place the indicator parts above the steering wheel. In that event, an enlargement or chamber 21 may be provided in the steering wheel column 22 to receive the disk 5 which is secured to the steering wheel shaft or post 1. The rocker 15 would, in that event, be journaled in the enlargement of the column 22.

While I have described the plate or dial 12 as attached to the throttle sector, this plate might be attached to one of the arms of the sector or to some other part of the mechanism. Similarly, other modifications might be resorted to within the scope of the invention.

What I claim is:

1. The combination with the hand-wheel steering-shaft of a vehicle, of an indicator operated by said hand wheel steering shaft adapted to disclose the position of the steering wheels operated by said steering shaft or steering wheel.

2. The combination with the steering shaft of a vehicle, of a cam operated by said shaft and an indicator operated by said cam which discloses the position of the steering wheels of the vehicle.

3. The combination with the steering shaft of a vehicle, of a cam operated by said shaft, a spring actuated rocker coöperating with said cam, and an indicating device operated by the rocker which discloses the position of the steering wheels of the vehicle.

4. A steering wheel indicator for vehicles comprising a turnable element adapted for direct actuation by the hand-wheel steering shaft of the vehicle, and an indicating device coöperating therewith adapted to disclose the position of the steering wheels.

5. A steering indicator for vehicles comprising a turnable cam adapted for actuation by the steering mechanism of the vehicle, a spring actuated rocker coöperating with the cam, and an indicating device operated by the rocker which discloses the position of the steering wheels.

In testimony whereof I affix my signature.

MILO D. BEACH.